United States Patent
Hunter et al.

(10) Patent No.: US 9,228,869 B2
(45) Date of Patent: Jan. 5, 2016

(54) INDUSTRIAL PROCESS VARIABLE TRANSMITTER WITH ISOLATED POWER SCAVENGING INTRINSICALLY SAFE PULSE OUTPUT CIRCUITRY

(71) Applicant: Rosemount Inc., Chanhassen, MN (US)

(72) Inventors: Kirk Allan Hunter, Shakopee, MN (US); Jordan Dennis Lucht, Maple Grove, MN (US); Jared James Dreier, Chaska, MN (US); Bruce David Rovner, Minneapolis, MN (US)

(73) Assignee: Rosemount Inc., Chanhassen, MN (US)

( * ) Notice: Subject to any disclaimer, the term of this patent is extended or adjusted under 35 U.S.C. 154(b) by 190 days.

(21) Appl. No.: 14/037,983

(22) Filed: Sep. 26, 2013

(65) Prior Publication Data

US 2015/0082904 A1     Mar. 26, 2015

(51) Int. Cl.
*G01F 1/56* (2006.01)
*G01F 1/716* (2006.01)
*G01P 5/08* (2006.01)
*G01F 1/60* (2006.01)
*G01D 21/00* (2006.01)
(Continued)

(52) U.S. Cl.
CPC *G01F 1/60* (2013.01); *G01D 21/00* (2013.01); *G01F 1/588* (2013.01); *G01J 1/44* (2013.01); *H04Q 2209/88* (2013.01)

(58) Field of Classification Search
CPC ..... H04Q 2209/88; G05B 9/02; G01D 11/00; H04B 3/548; H04L 25/02; H02M 3/137; G01F 1/60
USPC ....................................................... 73/861.08
See application file for complete search history.

(56) References Cited

U.S. PATENT DOCUMENTS

| 5,639,970 | A | 6/1997 | Schulz |
| 5,995,252 | A | 11/1999 | Nemer et al. |
| 6,555,935 | B1 | 4/2003 | Maskovyak et al. |

(Continued)

FOREIGN PATENT DOCUMENTS

| DE | 10 2009 008 087 | 8/2010 |
| DE | 10 2010 012 064 | 9/2011 |

(Continued)

OTHER PUBLICATIONS

Authors: Shu-Lin Liu , Jian Liu and Hong Mao, Title: Analysis and Design of Boost DC-DC Converters for Intrinsic Safety, Date: 2006, Publisher: IEEE, IPEMC, pp. 1-6.*

(Continued)

*Primary Examiner* — Harshad R Patel
*Assistant Examiner* — Roger Hernandez-Prewitt
(74) *Attorney, Agent, or Firm* — Westman, Champlin & Koehler, P.A.

(57) ABSTRACT

An industrial process variable transmitter includes a process variable sensor configured to sense a process variable. Measurement circuitry is coupled to the process variable sensor and provides a measured output as a function of the process variable. Output circuitry includes a loop connection configured to couple to a process control loop. An optical sensor receives the measured output from the measurement circuitry. A switching device applies pulses to the process control loop in response to an output from the optical sensor. Power supply circuitry powers the optical sensor, a comparator, and/or the switching device with power received from the process control loop and loop connection.

18 Claims, 3 Drawing Sheets

(51) Int. Cl.
*G01F 1/58* (2006.01)
*G01J 1/44* (2006.01)

(56) References Cited

U.S. PATENT DOCUMENTS

| | | | |
|---|---|---|---|
| 6,657,476 B1 | 12/2003 | Bicking | |
| 7,019,318 B2 | 3/2006 | Breinlinger | |
| 7,619,418 B2 | 11/2009 | Schulz et al. | |
| 7,714,562 B2 | 5/2010 | Oswald et al. | |
| 8,604,436 B1 | 12/2013 | Patel et al. | |
| 8,772,909 B1 | 7/2014 | Vinciarelli | |
| 2004/0181358 A1 | 9/2004 | Youngquist | |
| 2008/0012428 A1* | 1/2008 | Lalla | 307/97 |
| 2008/0074309 A1 | 3/2008 | Nilsson | |
| 2008/0147336 A1* | 6/2008 | Karbula et al. | 702/64 |
| 2008/0258736 A1 | 10/2008 | Schulz et al. | |
| 2010/0155627 A1 | 6/2010 | Baumgartner et al. | |
| 2013/0197818 A1 | 8/2013 | Karbula et al. | |
| 2013/0240764 A1 | 9/2013 | Kravitz | |
| 2014/0191143 A1 | 7/2014 | Shih et al. | |

FOREIGN PATENT DOCUMENTS

| | | |
|---|---|---|
| WO | WO 01/39515 | 5/2001 |
| WO | WO 2010/043876 | 4/2010 |

OTHER PUBLICATIONS

Author: unknown, Title: Optocoupler Designer's Guide, Date: Jun. 7, 2002, Publisher: Agilent Technologies, Pages: cover page, abstract page, table of content—two pages and pp. 1-78.*
Notification of Transmittal of the International Search Report and the Written Opinion of the International Searching Authority for PCT/US2014/052467, dated Nov. 20, 2014.
Notification of Transmittal of the International Search Report and the Written Opinion of the International Searching Authority for PCT/US2014/050512, dated Nov. 12, 2014.
Notification of Transmittal of the International Search Report and the Written Opinion of the International Searching Authority for PCT/US2014/049554, dated Nov. 26, 2014.
Office Action from U.S. Appl. No. 14/038,117, dated Nov. 7, 2014.
High-Speed Switching Transistor Handbook, Motorola, edited by William D. Reohr, 1963.
Final Office Action from U.S. Appl. No. 14/038,117, dated Mar. 26, 2015.
Non-Final Office Action from U.S. Appl. No. 14/037,852, dated May 19, 2015.

* cited by examiner

INDUSTRIAL PROCESS VARIABLE TRANSMITTER WITH ISOLATED POWER SCAVENGING INTRINSICALLY SAFE PULSE OUTPUT CIRCUITRY

BACKGROUND

The present invention relates to industrial process variable transmitters which measure a process variable and provide an output. More specifically, the present invention relates to such process variable transmitters which provide a pulse output representative of the process variable.

Industrial process variable transmitters are used to sense process variables in industrial processes. Example process variables include flow, temperature, level, pressure, etc. Such process variable transmitters typically couple to a process control loop which is used to transmit information related to the sensed process variable back to a centralized location. One type of process control loop carries electrical pulses which are related to the sensed process variable. For example, some types of flowmeters transmit flow related information using pulse output circuitry. Each pulse can be calibrated to a unit of flow. Thereby, a total amount of flow can be monitored by counting the number of pulses which are transmitted on the process control loop.

In many instances, the process variable transmitter must operate in accordance with Intrinsic Safety (IS) standards which provide design constraints on various aspects of the circuitry. Intrinsic Safety standards impose design constraints on devices to enable safe operation of electrical equipment in hazardous areas by limiting the energy available for ignition. These constraints place many limitations on circuitry and impose many engineering challenges on circuit design in an industrial process variable transmitter.

SUMMARY

An industrial process variable transmitter includes a process variable sensor configured to sense a process variable. Measurement circuitry is coupled to the process variable sensor and provides a measured output as a function of the process variable. Output circuitry includes a loop connection configured to couple to a process control loop. An optical sensor receives the measured output from the measurement circuitry. A switching device applies pulses to the process control loop in response to an output from the optical sensor. Power supply circuitry powers the optical sensor, a comparator, and/or the switching device with power received from the process control loop and loop connection.

DETAILED DESCRIPTION OF ILLUSTRATIVE EMBODIMENTS

In various aspects, an industrial process variable transmitter is provided which includes output circuitry configured to provide a pulse output on a process control loop. The output circuitry includes power supply circuitry which is configured to power the output circuitry using power received from the process control loop. The following discussion is directed to flowmeters of the type which measure flow using an applied magnetic field. However, the invention is applicable to other types of flow transmitters which use other flow measuring techniques such as vortex, differential pressure, coriolis, etc., as well as other process variables.

Figure 1:
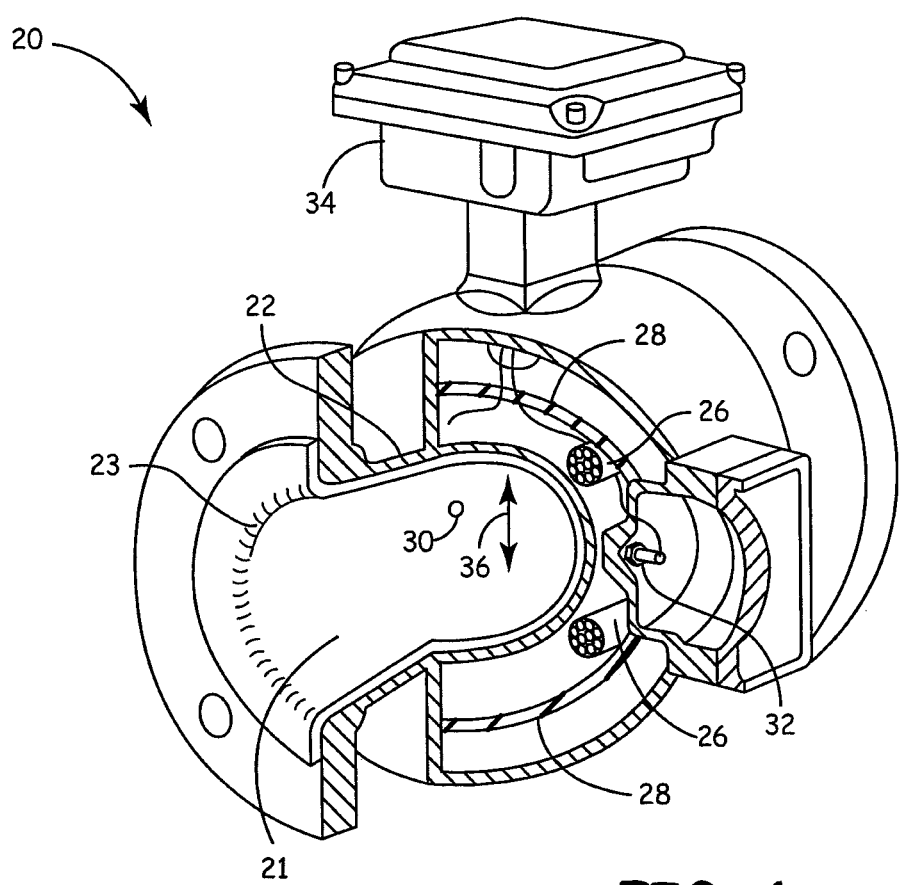
FIG. 1 is a partial cut away view of a magnetic flowmeter.

FIG. 1 is a partially cut away view of a magnetic flowmeter 20 in which embodiments of the present invention are particularly useful. Magnetic flowmeter 20 includes a flowtube 22 formed of low magnetic permeability material with an electrically insulating liner 23, an electromagnet 26 is formed by a coil, a ferromagnetic core or shield 28 and electrodes 30, 32. The electromagnet 26 and the electrodes 30, 32 are wired to a transmitter circuit 34. In operation, the transmitter circuit drives the electromagnets 26 with an electrical current, and the electromagnet 26 produces a magnetic field 36 indicated by arrows inside the flowtube 22. Process liquid 21 flows through the magnetic field in the flowtube 22, and the flow induces an electromotive force (EMF, voltage) in the liquid 21. The insulating liner 23 prevents leakage of the EMF from the liquid 21 to the metal flowtube 22. The electrodes 30, 32 contact the liquid 21 and pick up or sense the EMF which, according to Faraday's law, is proportional to the flow rate of the liquid 21 in the flowtube 22.

Figure 2:
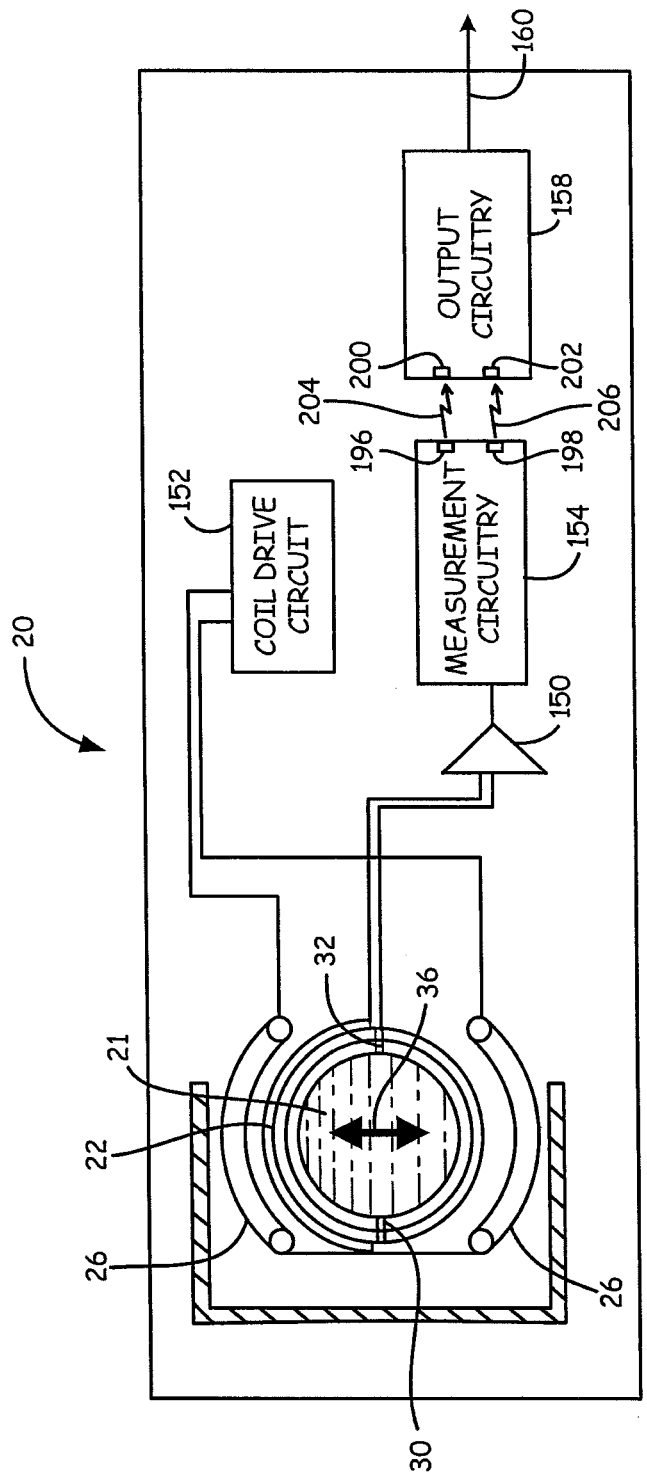
FIG. 2 is a simplified electrical schematic diagram of the magnetic flowmeter of FIG. 1.

FIG. 2 is a diagrammatic view of circuitry of magnetic flowmeter 20. The magnetic flowmeter 20 includes a flowtube 22 adapted to carry a flowing conductive liquid 21. Coils 26 are positioned proximate flowtube 22 to apply a magnetic field to the process fluid in response to a drive signal from drive circuitry 152. Electrodes 30 and 32 sense the EMF produced in fluid 21. The EMF is related to the flow of fluid 21 and the applied magnetic field 36. Electrodes 30 and 32 couple to measurement circuitry 154 through differential amplifier 150. Measurement circuitry 154 provides an output related to flow in accordance with known techniques. Measurement circuitry 154 can include, for example, suitably programmed or configured microprocessor(s) or digital signal processor (DSP) circuitry.

The output of measurement circuitry 154 is provided to output circuitry 158 for transmission to control or monitoring circuitry remote from magnetic flowmeter 20. Output circuitry 158 provides a pulse output. The output of output circuitry 158 is shown coupled to a process control loop 160. As illustrated for example in FIG. 3, loop 160 can be a current loop over which the pulse outputs are transmitted to control or monitoring circuitry 180 generally located remotely from flowmeter 20.

In accordance with Intrinsic Safety design requirements, information related to a measured flow is sent from measurement circuitry 154 to output circuitry 158 using optical coupling techniques. Specifically, two optocouplers are used in a push/pull configuration. Although unidirectional communication is shown, bi-directional communication may also be implemented by using additional optocouplers. A first optocoupler is formed by optical source 196 which transmits an optical signal 204 to optical sensor 200. A second optocoupler is formed by optical source 198 which transmits an optical signal 206 to optical sensor 202. The use of optocouplers allows data to be transmitted between the two circuits 154, 158 without an electrical connection therebetween. In some prior art configurations, in order to meet Intrinsic Safety requirements, the output circuitry 158 requires a separate isolated power supply and/or other isolation techniques from measurement circuitry 154. However, in the configurations discussed herein, the output circuitry 158 is powered with power received through loop 160. This simplifies circuit design and installation requirements.

Figure 3:
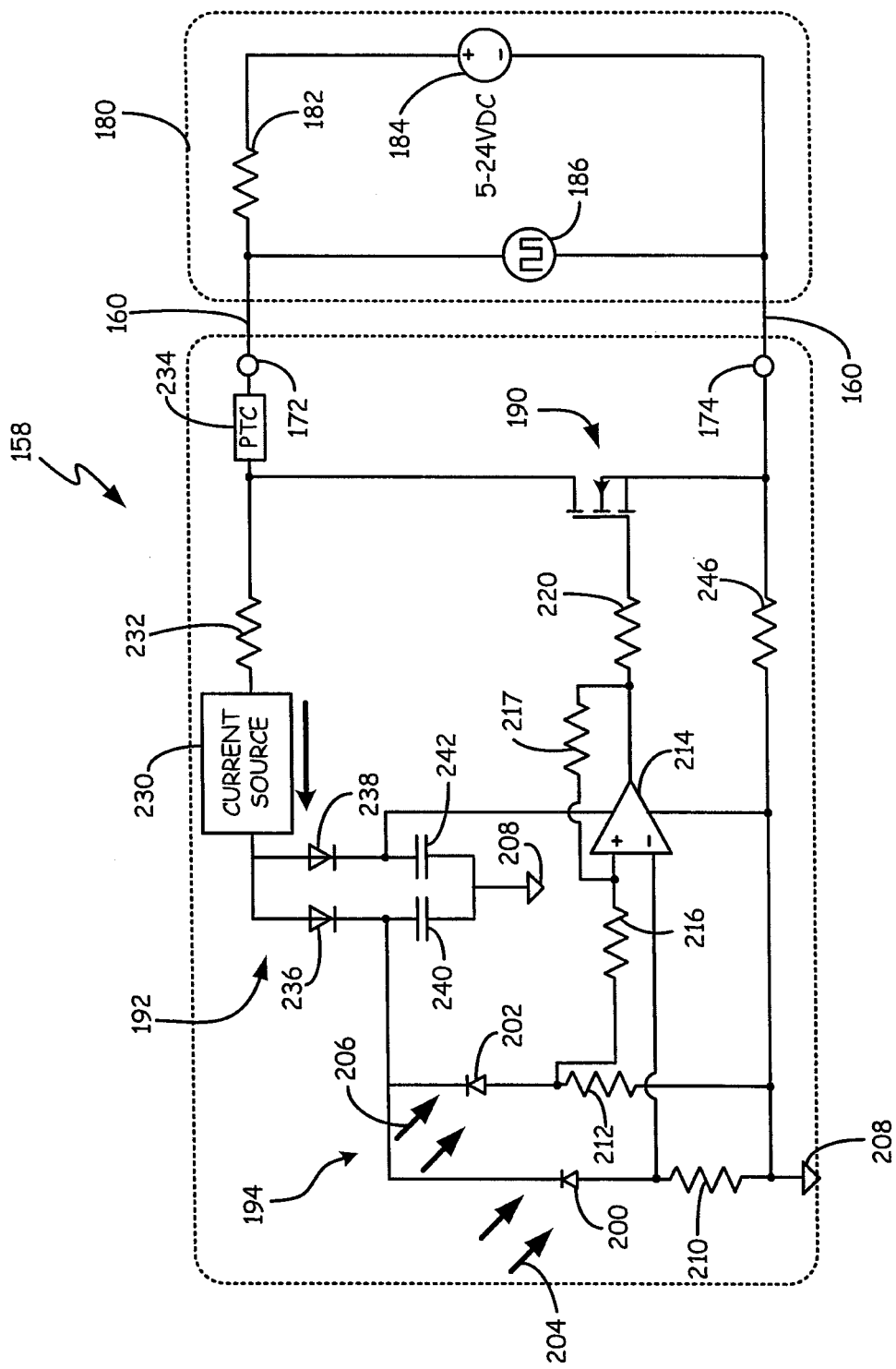
FIG. 3 is schematic diagram of pulse output circuitry configured to provide a pulse on a process control loop in response to a measured process variable.

FIG. 3 is a simplified electrical schematic diagram showing output circuitry 158 coupled to a location 180 through process control loop 160. Location 180 can be any location spaced apart from magnetic flowmeter 20. Examples include a remote location, a central control room, a monitoring station, etc. Output circuitry 158 couples to loop 160 through loop connectors 172 and 174. Circuitry at the remote location 180 is modeled as a pull up resistor 182 and a voltage source 184 which provides a power supply for the loop 160. A pulse counter 186 is configured to monitor pulses carried on loop 160 which are transmitted by output circuitry 158 and related to the measured process variable.

Output circuitry 158 generally includes an output transistor 190, a power supply 192 and driver circuitry 194. Driver circuitry 194 is configured to operate in a push/pull manner and includes optical sensors 200, 202 which are the receiving portions of optical isolators which receive signals 204 and 206, respectively, from measurement circuitry 154. This push/pull configuration provides a large noise immunity to the signal being transmitted from measurement circuitry 154 to output circuitry 158. Optical sensors 200 and 202 couple to electrical ground 208 through resistors 210 and 212, respectively. Sensors 200 and 202 are coupled to the inverting and non-inverting inputs, respectively, of the comparator 214 such that they operate in a push/pull configuration. Resistors 216 and 217 are configured to provide comparator 214 with positive feedback. The output from comparator 214 is provided to the gate of transistor 190 through an Intrinsic Safety resistance 220.

Power supply 192 includes a current source 230 which connects to the loop 160 through Intrinsic Safety resistance 232 and a PTC (Positive Temperature Coefficient Thermistor) 234. Current source 230 provides the required current to diodes 236 and 238. Diodes 236 and 238 are used to couple the current source 230 to capacitors 240 and 242, respectively. Capacitor 240 provides a power supply to optical sensors 200 and 202. Capacitor 242 is arranged to provide a power supply to comparator 214. The diodes 236 and 238 prevent power from being depleted from capacitors 240 and 242 during pulse on times. Constant current source 230 is preferably temperature compensated to provide the required current across the expected operating temperature range.

During operation, signals 204 and 206 are inverse of each other and alternate between causing sensors 200 and 202 to turn on or off thereby providing a differential input to comparator 214. When the output from comparator 214 goes high, a high signal level is applied to the gate of transistor 190 using power supplied by capacitor 242 thereby causing transistor 190 to turn on. In this condition, substantially all of the current flowing through loop 160 flows through transistor 190. When the output from comparator 214 goes low, transistor 190 is turned off. In this manner, pulses can be applied to loop 160. Note that when transistor 190 is conducting ("on"), substantially no current is available to flow through current source 230. Thus, during this period, sensors 200 and 202, comparator 214 and transistor 190 are powered with power stored in capacitors 240 and 242. On the other hand, when current is not flowing through transistor 190 (the transistor 190 is "off"), the current source 230 will be able to supply current thereby charging capacitors 240 and 242. In this way, power is "scavenged" from loop 160 during periods when loop 160 is in a high voltage/low current pulse condition.

When transistor 190 is closed, it is preferable that the output voltage between terminals 172, 174 be as low as possible. This allows for greater flexibility in the design and operation of pulse counter 186. It is desirable to have an "on" voltage across terminals 172, 174 of less than one volt.

In one specific configuration, the voltage supplied to comparator 214 by power supply 192 is 5 volts. Depending upon the value of pull up resistor 182, a voltage drop will occur across transistor 190 when transistor is "on" during a pulse. Preferably, this voltage drop is less than about 100 mV. The combination of the pull up resistance 182 and the voltage 184 determine how much current flows through the transistor 190 when the transistor 190 is on. These components also determine how quickly any capacitance in the cabling of loop 160 is overcome, and thus how much charge is capable of reaching the output circuitry 158 to replenish the power supply voltage before the next "on" cycle of transistor 190. A value of the pull up resistance 182 which is too high, too much cable capacitance, or a power supply 184 which has a voltage which is too low can limit the functionality of circuitry 158.

The specifications of transistor 190 should be selected as desired. In one specific configuration, transistor 190 is a MOSFET. Various criteria which may affect the selected transistor include a low gate charge $Q_G$. This reduces the amount of energy required for each switching cycle and thus improves the ability to function at low power and high speed. The on resistance of transistor 190 is preferably low, for example less than 2 ohms. The gate threshold voltage is preferably below 2 volts to allow the circuitry to run at very low voltages. However, the gate threshold voltage should be greater than about 0.5 volts so that the transistor 190 will reliably turn off. Specifically, Intrinsic Safety resistor 246 creates a DC voltage at the gate of transistor 190 due to the ground location of the comparator 214. Further, the drain-source voltage rating should be at least 30 volts in order to allow flexibility in the value of the supply voltage 184.

Intrinsic Safety resistors 220, 232 and 246 can be selected as desired in order to meet Intrinsic Safety (IS) requirements. Resistors 220, 232 and 246 operate to limit the maximum energy which transmitter 20 can discharge to loop 160 in a fault condition. Various design constraints that should be considered include possible current paths that a fault current could take, worse case power dissipation for each resistor for each such fault condition, etc. Intrinsic Safety resistor 232 is preferably selected with a sufficiently low value to reduce the voltage drop between the external power source 184 and the output circuitry 158. Similarly, Intrinsic Safety Resistance 246 should also have a sufficiently low value for the above reason, and also to reduce the DC bias on the gate of transistor 190. Intrinsic Safety resistance 220 may have a relatively high value as it is simply used to couple a voltage to the gate of transistor 190, which has some capacitance. Increased values of resistance 220 can also reduce the switching speed of the transistor 190, with the added benefit of reducing ringing on longer cable lengths in loop 160.

This configuration provides a pulse output in which the on voltage is less than 100 mV while also providing Intrinsic Safety. Further, pulses can be transmitted at a rate of 5,500 Hz. Power is scavenged during the pulse off time in order to power pulse circuitry during the pulse on time. In one configuration, the normal state of transistor 190 is an off condition such that a sufficient voltage is available between terminals 172 and 174 that capacitors 240 and 242 can be charged. When a pulse is applied to loop 160, transistor 190 momentarily turns on, thereby conducting a loop current there through and causing a pulse to be registered by pulse counter 186. Note that the frequency, duty cycle, value of resistor 182 and value of voltage source 184 must all be considered when determining if capacitors 240 and 242 are able to store a sufficient voltage to power the pulse circuitry during transistor on times.

Although the present invention has been described with reference to preferred embodiments, workers skilled in the art will recognize that changes may be made in form and detail without departing from the spirit and scope of the invention. The magnetic flowmeter described herein is used for example purposes and other types of process variable sensors may be employed. Other coupling techniques may be employed and the invention is not limited to the optocoupler or push/pull technique described herein. Although a transistor is discussed above for generating pulses, any type of switching device may be employed.

What is claimed is:

1. An industrial process variable transmitter, comprising:
    a process variable sensor configured to sense a process variable;
    measurement circuitry coupled to the process variable sensor configured to provide a measured output as a function of the process variable;
    output circuitry, comprising:
        a loop connection configured to couple to a process control loop;
        an optical sensor configured to receive the measured output from the measurement circuitry;
        a second optical sensor configured to receive the measured output from the measurement circuitry;
        a switching device configured to apply pulses to the process control loop in response to an output from the optical sensor;
        power supply circuitry configured to power the optical sensor with power received from a power source through the process control loop and loop connection; and
        wherein the optical sensor and the second optical sensor are configured to operate in a push/pull configuration.

2. The apparatus of claim 1, wherein the optical sensor and the second optical sensor provide output signals to a comparator which drives the switching device.

3. The apparatus of claim 1, wherein the power supply circuitry includes a capacitor arranged to provide power to the optical sensor when the switching device is in an on condition.

4. The apparatus of claim 1, wherein the power supply circuitry includes a capacitor configured to provide power to a comparator when the switching device is in an on condition.

5. The apparatus of claim 1, wherein the power supply includes a current source.

6. The apparatus of claim 5, wherein the current source is temperature compensated.

7. The apparatus of claim 5, wherein the current source is configured to charge a capacitor when the switching device is in an off condition.

8. The apparatus of claim 1, wherein the power supply circuitry includes a diode to prevent discharge of stored power when the switching device is in an on condition.

9. The apparatus of claim 1, including at least one resistor configured to limit power which can be applied from the output circuitry to the process control loop.

10. The apparatus of claim 1, including a magnetic coil positioned proximate the process fluid configured to apply a magnetic field to a flow of process fluid and wherein the process variable sensor comprises a pair of electrodes configured to sense an EMF related to flow rate.

11. A method of communicating a process variable in a process variable transmitter, comprising:
    sensing a process variable with a process variable sensor;
    providing a measured output signal related to the sensed process variable;
    receiving the measured output signal with an optical sensor;
    receiving the measured output signal with a second optical sensor;
    applying a pulse to a process control loop based upon an output from the optical sensor;
    powering the optical sensor with power received from the process control loop; and
    wherein the optical sensor and the second optical sensor are configured to operate in a push/pull configuration.

12. The method of claim 11, including driving a comparator with outputs from the optical sensors.

13. The method of claim 11, including storing power in a capacitor arranged to provide power to the optical sensor when a switching device used to apply the pulse is in an on condition.

14. The method of claim 11, including storing power in a capacitor configured to provide power to a comparator when a switching device used to apply the pulse is in an on condition.

15. The method of claim 11, including charging a capacitor when a switching device is in an off condition.

16. The method of claim 11, including preventing discharge of stored power when a switching device used to apply the pulse is in an on condition.

17. The method of claim 11, including limiting power which can be applied from the output circuitry to the process control loop.

18. The method of claim 11, including applying a magnetic field to a flow of process fluid and wherein the process variable comprises an EMF related to flow rate.

* * * * *